United States Patent
Shannon

(10) Patent No.: US 6,224,383 B1
(45) Date of Patent: May 1, 2001

(54) METHOD AND SYSTEM FOR COMPUTER ASSISTED NATURAL LANGUAGE INSTRUCTION WITH DISTRACTERS

(75) Inventor: Marvin Shannon, Pasadena, CA (US)

(73) Assignee: planetLingo, Inc., Pasadena, CA (US)

( * ) Notice: Subject to any disclaimer, the term of this patent is extended or adjusted under 35 U.S.C. 154(b) by 0 days.

(21) Appl. No.: 09/277,208

(22) Filed: Mar. 25, 1999

(51) Int. Cl.[7] .................................................. G09B 19/00

(52) U.S. Cl. .............................. 434/156; 434/185; 704/9; 704/200; 704/231

(58) Field of Search ................................ 704/9, 200, 231; 434/156, 185; 379/907

(56) References Cited

U.S. PATENT DOCUMENTS

| | | |
|---|---|---|
| 5,487,671 | 1/1996 | Shpiro et al. . |
| 5,540,589 | 7/1996 | Waters . |
| 5,566,272 | 10/1996 | Brems et al. . |
| 5,697,789 | 12/1997 | Sameth et al. . |
| 5,717,828 | 2/1998 | Rothenberg . |
| 5,754,972 | * 5/1998 | Baker et al. ..................... 704/200 X |
| 5,761,631 | 6/1998 | Nasukawa . |
| 5,810,599 | 9/1998 | Bishop . |
| 5,865,626 | 2/1999 | Beattie et al. . |
| 5,870,709 | 2/1999 | Bernstein . |
| 5,971,904 | 8/1998 | Russell et al. . |
| 6,061,646 | * 5/2000 | Martino et al. ..................... 704/3 X |

FOREIGN PATENT DOCUMENTS

| | | |
|---|---|---|
| WO 98/14934 | 9/1998 | (WO) . |
| WO 98/55980 | 12/1998 | (WO) ............................ G09B/17/00 |

OTHER PUBLICATIONS

How Speech Recognition Works, Tutorial: http://sip.uwaterloo.ca/tutorials/HOWSR.HTM, Oct. 9, 1998 Rabiner et al., Fundamentals of Speech Recognition, Sec. 8.3, Mar. 24, 1999.

Molholt, West Chester University; Tesol Quarterly, Computer–Assisted Instruction in Pronunciation for Chinese Speakers of American English, vol. 22, Mar. 1988.

(List continued on next page.)

*Primary Examiner*—Michael O'Neill
*Assistant Examiner*—Chanda Harris
(74) *Attorney, Agent, or Firm*—Wilson Sonsini Goodrich & Rosati

(57) ABSTRACT

A method of computerized language instruction for a student. Based on data regarding past performance of the student, an adjustable speech recognizer is adjusted. An utterance is received from the student, and the utterance is processed using the adjusted adjustable speech recognizer. The adjustable speech recognizer may comprise an Automatic Speech Recognition (ASR) engine. A set of contexts is created. Each context includes a set of words and utterances selected to allow recognition of the words and utterances by a speech recognizer. For each context, a set of subcontexts is created. Each subcontext includes the words and utterances of the context and selected mispronunciations or misarticulations of the words and utterances of the context. Recursively passing a portion of a received utterance to an ASR engine is described. According to one embodiment, a context includes a set of words and utterances selected to allow recognition of the words and utterances by a speech recognizer, and a set of distracters, which comprise sets of syllables used less frequently in the context, the sets of syllables not forming words or utterances in the context. Systems based on the described methods are disclosed.

12 Claims, 2 Drawing Sheets

OTHER PUBLICATIONS

Molholt, West Chester University; Computers and Humanities: Spectrograping Analysis and Patters in Pronunciation, 24: 81–92, 1990.

Molholt et al., Computer Assisted Evaluation of Pronunciation: A Progress Report, 1985 HUE Annual Meting and Symposium, Jul. 1985.

Molholt et al., Computer Graphics in the Language Lab; T.H.E Journal, Feb. 1988, pp. 74–78.

Molholt, West Chester University, Approaches to Pronunciation Teaching: Visual Displays Develop Awareness of Inteligible Pronunciation Patterns.

Eskenazi, Carnegie Mellon University, Using Automatic Speech Processing For Foreign language Pronunciation Tutoring: Some Issues and a Prototype., vol. 2, No. 2, Jan. 1999, pp. 62–76.

Molholt et al., Correlation Between Human and Machine Ratings of Test of Spoken English Reading Passages, pp. 111–127, 1986.

Russell et al., Application of automatic speech recognition to speech and language development in young children, pp. 176–179, (1996).

Mostow et al., Prototype reading coach that listens, pp. 785–792, (1994).

Mostow et al., Towards reading coach that listens: automated detection of oral reading errors, pp. 392–397 (1993).

Topolewski et al., Method for Computer–aided Foreign Language Instruction; filed: Oct. 15, 1998, Serial No.: 09/173,357.

* cited by examiner

METHOD AND SYSTEM FOR COMPUTER ASSISTED NATURAL LANGUAGE INSTRUCTION WITH DISTRACTERS

BACKGROUND

1. Field of the Invention

The invention relates to computer assisted natural language instruction.

2. Description of Related Art

Learning a language can be difficult. A foreign language student typically invests many years of study and may still never achieve fluency or reduction of an accent. Many students have invested heavily in language instruction by human teachers. Such training may be expensive, and inconsistent, because of the differences in training and ability of the teachers.

Some foreign language instructional software has been developed. For example, systems are described in U.S. Pat. Nos. 5,810,599 and 5,697,789. Some prior systems provide non-interactive language instruction. Such a system may not sufficiently provide feedback to a student to allow the student to correct pronunciation problems. The student may continue to make the same errors, without improvement even after diligent training with the system.

In addition to learning foreign languages, it is desirable to improve pronunciation and articulation of one's native language. It would be desirable to obtain a system and method to assist in doing so.

SUMMARY OF THE INVENTION

An embodiment of the invention relates to a method of computerized language instruction for a student. Based on data regarding past performance of the student, an adjustable speech recognizer is adjusted. An utterance is received from the student, and the utterance is processed using the adjusted adjustable speech recognizer. The adjustable speech recognizer may comprise an Automatic Speech Recognition (ASR) engine.

The data regarding past performance of the student includes data regarding detected speech pathologies, or may comprise data regarding past performance of the student with a series of contexts, wherein a context comprises a set of words and utterances. The data regarding past performance of the student may comprise a statistical weighted average of data regarding past performance of the student with each of a series of contexts. A context may comprise a set of words and utterances selected to allow recognition of the words and utterances by the adjustable speech recognizer. Processing the utterance using the adjusted adjustable speech recognizer then may include determining whether the utterance matches an utterance in a selected context.

According to an embodiment of the invention a set of contexts is created. Each context includes a set of words and utterances selected to allow recognition of the words and utterances by a speech recognizer. For each context, a set of subcontexts is created. Each subcontext includes the words and utterances of the context and selected mispronunciations or misarticulations of the words and utterances of the context. A subcontext is selected from the set of contexts. An utterance is received from a student. The utterance is processed based on the selected subcontext, and the student is responded to based on the processing.

An embodiment of the invention includes recursively passing a portion of a received utterance to an ASR engine. The words in the utterance are determined based on a first output of the ASR engine and a second output of the ASR engine resulting from processing the portion.

An embodiment of the invention includes creating a context. The context includes a set of words and utterances selected to allow recognition of the words and utterances by a speech recognizer, and a set of distracters, which comprise sets of syllables used less frequently in the context, the sets of syllables not forming words or utterances in the context. An audio input is received, and the input is compared with information in the context. If the input more closely matches a distracter than a word or utterance, the input is ignored. Otherwise, the input is processed to determine an associated word or utterance.

Embodiments of the invention include systems based on the described methods. Embodiments of the invention include a computer readable medium having computer readable code embodied on the medium that causes a computer to execute the described methods or portions or combinations thereof. The computer readable medium may comprise a floppy disk, CD ROM, memory, or other medium.

One embodiment of the invention is a system for computerized language instruction for a student. The system includes a processor and logic to receive a digital representation of an audio signal. An adjustable speech recognizer is coupled to receive the digital representation. Logic in the system stores data onto a storage device based on performance of the student, and logic in the system adjusts the adjustable speech recognizer based on the stored data based on performance of the student.

BRIEF DESCRIPTION OF THE DRAWINGS

The invention is illustrated by way of example, and not limitation in the drawings.

DETAILED DESCRIPTION

The following is a description of embodiments of the invention. The embodiments shown help to illustrate the invention. However, it is not intended that the invention be limited to the precise embodiments shown.

One embodiment of the invention is a system for computerized language instruction. The system includes an ASR engine, which performs initial processing on an utterance by the student. An NLP engine performs further processing on the data yielded by the ASR engine. The ASR engine processes based on a context, which includes various words and utterances expected from the student. The context also includes various mispronunciations or misarticulations of the word or utterances. The ASR determines whether the incoming audio matches items in the context. Thus, incoming speech is recognized by finding a match with an item in the context. According to one embodiment of the invention, multiple subcontexts exist, which can be varied according to the past performance of the student in the system. The subcontexts include different mispronunciations or misarticulations of the words in the context and are selected so as to match different levels of development of the student. The selection is based on a grading of a student, and the grading is based on the performance of the student with the system. Optional subparsing provides additional processing of portions of the utterance in order to provide better resolution of individual words or portions of the utterance. Settings of the ASR engine, according to an embodiment of the invention, may be varied depending on the student's past performance with the system.

The system teaches the language through a series of lessons which may be taken over a period of sessions over many days. Student performance includes the correctness with which the student pronounces words in the language in the various lessons. Student performance may be tracked within the various lessons and over a period of time including various sessions with various lessons over many days.

Figure 1:
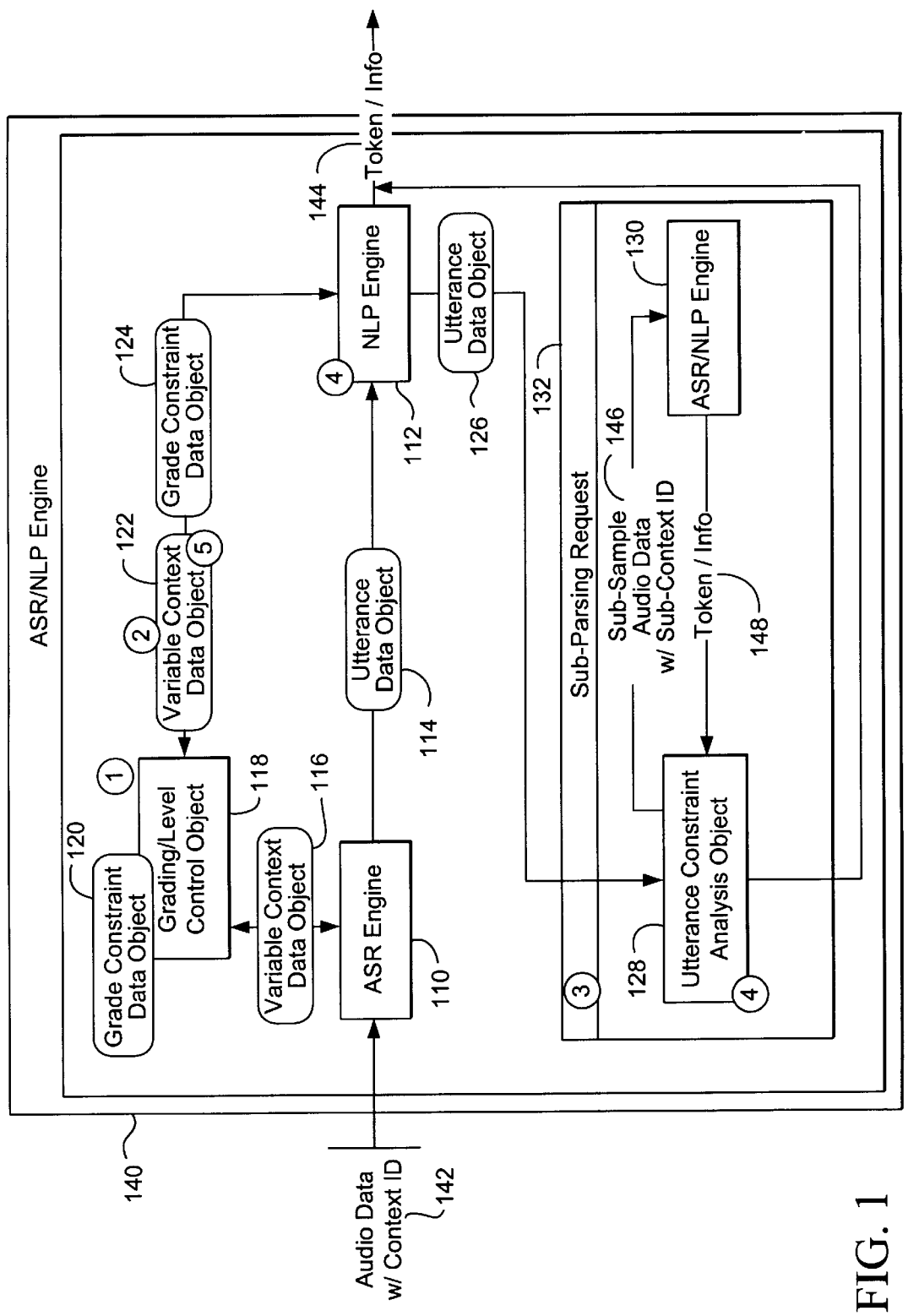
FIG. 1 is a block diagram of a system for computerized language instruction, according to an embodiment of the invention.

FIG. 1 is a block diagram of a system for computerized language instruction, according to an embodiment of the invention. The ASR/NLP engine 140 may be implemented in a computer system, such as a multimedia desktop computer including a processor, monitor, storage, microphone, and speakers. Alternatively, ASR/NLP engine may be implemented in another computer system, such a server on a network. The ASR/NLP engine 140 includes an Automatic Speech Recognition (ASR) engine 110 and Natural Language Processing (NLP) engine 112, which process input, Audio Data with Context ID 142 to provide token/info 144. ASR engine 110 receives the Audio Data w/Context ID 142. Audio Data w/Context ID 142 represents audio data, such as from a wave format data buffer, received by the computer, for example by a microphone coupled to a local computer. The audio received may include an utterance by a student and other audio input, such as noise.

ASR Engine 110 processes Audio Data w/Context ID 142 based on Variable Context Data Object 116. Variable Context Data Object 116 includes variable mispronunciation or misarticulation subcontexts selected from a family of subcontexts selected based on grade level and success rate of the student. Grading/Level Control Object 118 maintains the current grade level information based on student history and is used for selecting the subcontext by Variable Context Data Object 116. Grade Constraint Data Object 120 includes variable pronunciation constraints loaded from a database. Variable Context Data Object 122 also includes variable mispronunciation or misarticulation subcontexts selected from a family of subcontexts selected based on grade level and success rate of the student and is an input to Grading/Level Control Object 118. Grade Constraint Data Object 124 includes variable pronunciation constraints loaded from a database and is an input to NLP Engine 112.

Utterance Data Object 114 is output by ASR Engine 110 and includes such information as an N-best list, timing, and positional information. Utterance Data Object 114 is passed to NLP 112 to determine a candidate utterance, which is output in the form of Token/Info 144.

ASR/NLP Engine 140 recursively passes a portion or portions of the Utterance Data Object 126 into the ASR/NLP Engine. This helps to more accurately determine the words contained within the utterance. As shown, Utterance Data Object 126 is passed into block Sub-Parsing Request 132. Utterance Constraint Analysis Object 128 receives Utterance Data Object 126 and determines the portion, or subfragment, of Utterance Data Object 126 to analyze. The Sub-Sampled Audio Data with Sub-Context ID 146 is passed from Utterance Constraint Analysis Object 128 to ASR/NLP Engine 130 for processing. The resulting Token/Info 148 is passed to Utterance Constraint Analysis Object 128, which then yields a result as Token/Info 144.

ASR/NLP engine is described with many of the components shown as objects, which may be implemented in an object oriented paradigm. Such functionality may also be implemented in other programming paradigms, such as in a structured programming architecture using function calls, or other software architecture. Alternatively, ASR/NLP engine functionality may be implemented in hardware.

One example of an ASR takes input from a microphone or wavebuffer and makes a determination based on a statistical analysis to determine what words of series of words are associated with incoming speech. An N-best list is built, which includes a set of N words for each position in the utterance and respective probabilities for each word. An ASR is adjustable in that it has a number of settings which determine how it processes incoming data. The settings may include voice model (male/female/child), number of states (number of states in the Hidden Markov Model, which relate to granularity), rejection penalties, and garbage penalties. According to one example of an ASR, adjustments to the ASR include (1) number of processing states, (2) amount of time the ASR spends processing the utterance, (3) garbage penalty, (4) rejection penalty, (5) minimum duration, and (6) sensitivity. For discussion of computer speech recognition, see *Fundamentals of Speech Recognition*, by Lawrence Rabiner and Biing-Hwang Juang, published by Prentice Hall, Englewood Cliffs, N.J., which is incorporated herein by reference in its entirety.

One embodiment of the invention is a system with an adjustable speech recognizer, such as an ASR, where the adjustable speech recognizer is adjusted based on the student performance. Accordingly, according to an embodiment of the invention, the Grading Level Control Object 118 allows the system or a user, such as the student or teacher, to set a series of variables to adjust the ASR to accept or reject utterances unconditionally or to accept conditionally. The variables to be set include states used with the Hidden Markov Model, rejection penalties, garbage penalties, voice models and other items. When under the control of the program, the variables can be adjusted so that the ASR is more accepting or less accepting.

Past student performance is used to adjust an ASR, according to one embodiment of the invention, by statistically combining data corresponding to student performance in various aspects of the system. An ASR's settings may be selected based on statistical cumulative percentages of correct performance by the student in the past. If the student has performed well in a large number of past sessions, then ASR settings of the ASR are not varied as greatly as in a case where the student has not performed well in a large number of past sessions. An advantage of setting the ASR in this manner is that the student's current performance may be low because of an aberration that day, e.g., the student is tired, and may not warrant a large change in the settings of the ASR.

According to one embodiment of the invention, selected ones or all of the following parameters of an ASR arc adjusted based on past student performance: (1) number of processing states, (2) amount of time the ASR spends processing the utterance, (3) garbage penalty, (4) rejection penalty, (5) minimum duration, and (6) sensitivity.

The parameters are adjusted based on the grade level of the student, and the grade level of the student is determined based on the past performance of the student with the system. For each grade level, a particular set of ASR parameters are selected. The set of ASR parameters associated with a grade level are determined empirically for the particular ASR and hardware, such as microphone, sound cards, etc. For the most challenging grade level, settings are chosen based on the settings that yield the best recognition by the ASR of voice input from a number of excellent speakers of the language which for which instruction is given by the system (the target language). For other grade levels, sets of speakers are chosen with other respective levels of ability in the target language. The other sets of speakers are typically native speakers of another language, other than the target language. This other language is the language of the student for whom the system is designed. For example, if the system is designed to teach English to Japanese speakers, the first set of speakers for the most advanced grade level may be perfect speakers of English. The speakers used to develop the settings for the other grade levels would be native speakers of Japanese with respectively varying abilities in English. The system may be used for teaching a first language, or accent reduction for speakers of one dialect who wish to be understood in another dialect. For example, the system may be used to teach British English to persons who first learned Singapore English. In such cases, appropriate groups of speakers are chosen to develop the respective grade levels.

According to one embodiment of the invention, statistics are stored based on the student's past pathologies on a per pathology basis. Statistics are also stored for the student for each context. A student progress is tracked as a grade level (Gw) and a pathology level (Pw). A Word Error Rate (WER) and Word Pathology Rate (WPR) are tracked. For a new student (user), Pw=Pmax and Gw=Gmid. For a returning student (user) Pw=Phistory and Gw=Ghistory. The following sequence is followed to determine ASR settings, according to an embodiment of the invention,

```
if WER decreasing
    if WPR decreasing
        decrease Pn -> (Pn - 1 || P0)
    if WPR increasing
        increase Pn -> (Pn + 1 || Pmax)
    increase Gn -> (Gn + 1 || Gmax)
    clear loop counter
else if WER increasing
    if at Pmax
        decrease Gn -> (Gn - 1 || G0)
        clear loop counter
    increment loop counter
    at low loop counter
        increase Pn -> (Pn + j || Pmax)
        [Pn + j = last active pathology]
    at high loop counter
        increase Pn -> (Pn + k || Pmax)
            where K is some number of pathology levels as
            determined by a fixed percentage of total pathology levels
```

In the code shown above, a loop may comprise completion of some portion of language instruction, such as a unit of 4 or 5 utterances.

Thus, a grade level is determined and changed dynamically for a student as the student uses the system. The grade level is one example of data regarding past performance of the student and can be used to adjust the ASR, based on a set of ASR settings associated with the grade level.

In addition to adjusting the ASR settings, a subcontext may be chosen based on the student's past performance. According to one embodiment of the invention, the ASR settings are changed to make the ASR more sensitive when the student gets a large number of words correct. The context is changed to a lower level if the student tends to fail lessons. This adjustment is made because the failure of lessons may be an indication of a specific pathology, which can be addressed by a subcontext which includes mispronunciations or misarticulations based on that pathology.

According to one embodiment of the invention, the student is prompted to speak about a one particular topic at a time. For each topic, the system stores a context, which includes words and utterances related to the topic. The words and utterances in the context are chosen so as to help the ASR to distinguish the words in the context. The context may be stored as text or binary representation, BNF grammar, or other format.

According to one embodiment of the invention, the system presents to the student graphics of various physical settings. For example, the settings may include a restaurant, a store, a home, or an airport. In the various physical settings or in portions of the various physical settings, the student may speak about relevant topics. The physical setting or portion of the physical setting may correspond to a context.

A context is used both by an ASR and an NLP. The context is used both for the purposes of comparison and utterance strength.

For each expected utterance the program receives, it has pre-defined context that includes the anticipated utterances. Included in this context are expected mispronunciations or misarticulations according to an embodiment of the invention. For example, the program expects "I would like some rice." In addition to the example being in the context, mispronunciations such as "I would rike some lice" or "I would rike some rice" would also be included. The inclusion of specific items in the context will depend to some degree on the grading level used at a particular time.

A set of contexts is created. A context would typically be created by a linguist. Each context includes a set of words and utterances selected to allow recognition of the words and utterances by a speech recognizer, such as an ASR. Each context includes mispronunciations or misarticulations of the words in the context. Each context is divided into subcontexts, with each subcontext including various mispronunciations or misarticulations of the words in the context. The subcontexts may be created so that they reflect mispronunciations or misarticulations encountered in various stages of learning the language, or may target a particular pathology.

According to an embodiment of the invention, the subcontext is selected based on past performance of the student. If past performance of the student indicates a particular pathology that can be effectively addressed with a particular subcontext, that particular subcontext is chosen. The first subcontext chosen for a beginning student would include mispronunciations or misarticulations typical of a beginning student of a particular native language learning the language. Therefore, different families of subcontexts are designed for native speakers of different languages learning the same language. When the ASR/NLP or other speech processing system detects mispronunciations or misarticulations in the received utterance, the system provides the student feedback regarding the mispronunciation or misarticulations.

Figure 2:
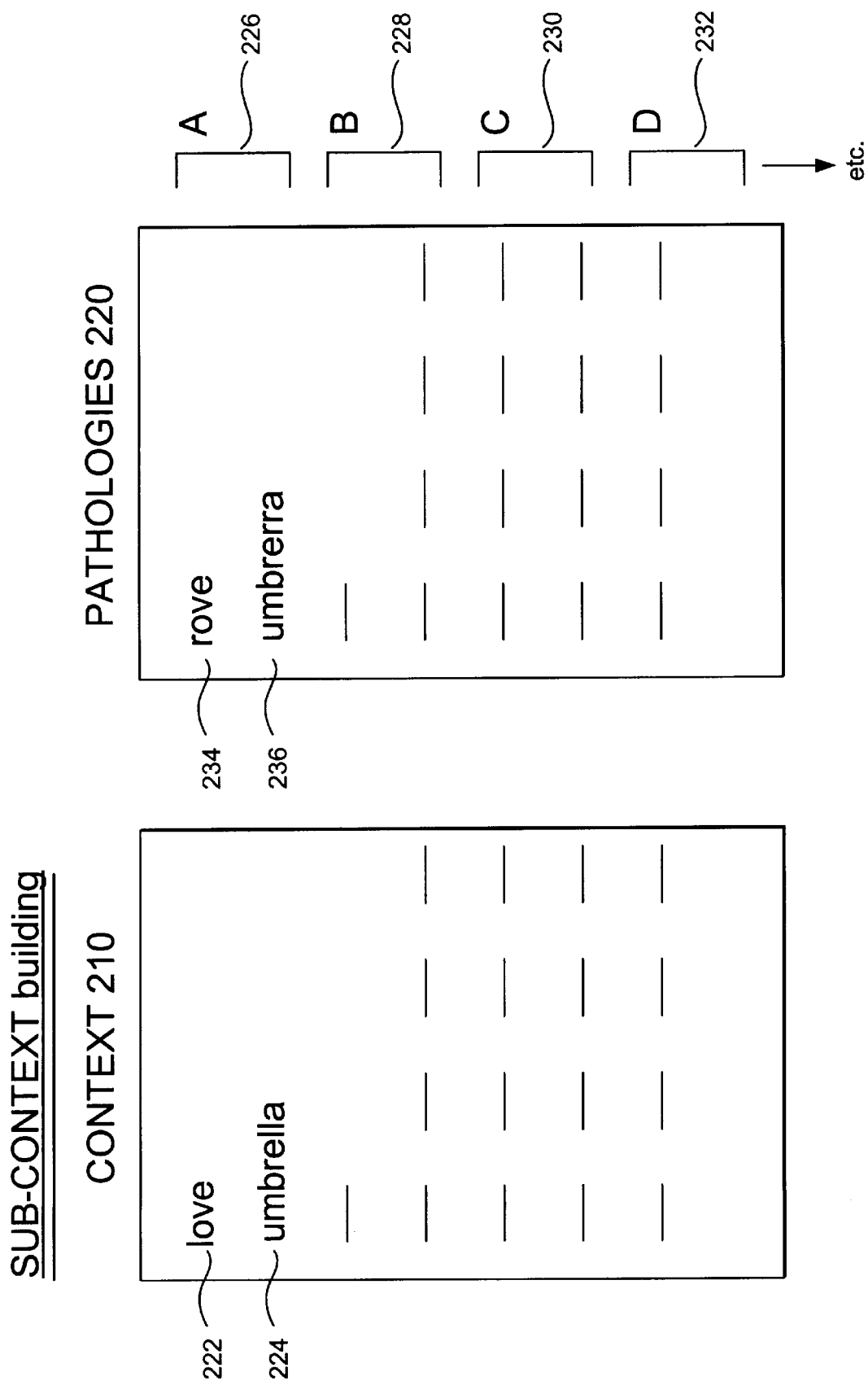
FIG. 2 is a schematic of a context and sets of pathologies, according to an embodiment of the invention.

FIG. 2 is a schematic of a context and sets of pathologies, according to an embodiment of the invention. Context 210 includes a number of utterances and words, such as the word "love" 222 and the word "umbrella" 224. Set of pathologies 220 includes subset 226, which includes mispronunciation "rove" 234 and "umbrerra" 236. Set of pathologies 220 also includes subsets 228, 230, and 232. Context 210 is a dictionary of words and phrases. Set of pathologies 220 is a dictionary of all of the most frequent mispronunciations or misarticulations that occur when learning one language from another (for example - when a Japanese speaker is learning English). According to an embodiment of the invention, the pathologies are sorted from those that occur most to those that occur least. For example, the English words that are typically the most difficult for Japanese speakers to pronounce will have a higher acceptance level in the pathology box. Words that are typically not as difficult to pronounce will have a lower threshold for mispronunciation. The system uses the subcontexts in the sorted order.

Thus, for a particular context "C,"

$C_0$=the entire context (the entire dictionary of words)
$C_1$=the entire context plus Pathology group A (The mispronunciations which occur the most)
$C_2$=the entire context plus Pathology group B (The mispronunciations which occur second most)

OR $C_2=C_1$ plus Pathology group B
$C_N$=the entire context plus the entire pathology set. (All mispronunciations or misarticulations)

This would be for very beginners for example. They would be allowed the lowest threshold and many of their pronunciation mistakes would be accepted at first.

An advantage of development of subcontexts is flexibility. Given a set of subcontexts, an appropriate subcontext can be chosen to correspond to the specific speech problems of the student. Further, the subcontext helps to identify specific linguistic problems matching the mispronunciations or misarticulations in the subcontext. The approximate severity of the student's problem can also be identified. Computational burden on an ASR is reduced by separating mispronunciations into various subcontexts.

According to one embodiment of the invention, a context includes a set of distracters, which comprise sets of syllables used less frequently in the context. The sets of syllables in the distractors do not form words or utterances in the context. The distractors, according to one embodiment, have lengths in the range of 1 to n+2 syllables, wherein n comprises the number of syllables the word having the largest number of syllables in the context. A distracter does not have the same syllable in a row. An example of syllables used to form distracters would be nonsense syllables such as "um" or "er." The context does not include more that approximately 10 or 12 distractors of a given length.

An advantage of inclusion of distracters in a context is that noise may be mapped to the distracters. This occurs because, given the random pattern of the distracters, they tend to be more similar to noise than actual words and utterances in the context.

If the system detects noise, it ignores the noise. However, if the system detects an utterance for which it does not know the meaning, it responds. For example, in a context related to computers, if the student asks for a potato, the system may respond, "Sorry, I don't know what that means here."

Various embodiments of the invention have been illustrated in the figures and have been described in the corresponding text of this application. This foregoing description is not intended to limit the invention to the precise forms disclosed. Rather, the invention is to be construed to the full extent allowed by the following claims and their equivalents.

What is claimed is:

1. A method of computerized language instruction for a student, the method comprising:
   creating a context including
      a set of words and utterances selected to allow recognition of the words and utterances by a speech recognizer, and
      a set of distracters, which comprise sets of syllables used less frequently in the context, the sets of syllables not forming words or utterances in the context;
   receiving an audio input;
   comparing the input with information in the context;
   if the input more closely matches a distracter than a word or utterance, ignoring the input; and
   otherwise, processing the input to determine an associated word or utterance.

2. The method of claim 1, wherein the distracters have lengths in the range of 1 to n+2 syllables, wherein n comprises the number of syllables the word having the largest number of syllables in the context.

3. The method of claim 1, wherein a distracter does not include the same syllable next to the same syllable.

4. The method of claim 1, including processing the input with a speech recognizer and adjusting the speech recognizer based on data regarding past performance of the student.

5. The method of claim 1, including creating a set of subcontexts, each subcontext including the words and utterances of the context and selected mispronunciations or misarticulations of the words and utterances of the context, and wherein processing the input to determine an associated word or utterance includes determining whether the input matches a word or utterance or selected mispronounciation or misarticulartion thereof in a selected subcontext.

6. The method of claim 5, including, based on data regarding past performance of the student, selecting the subcontext.

7. A system for computerized language instruction for a student, the system comprising:
   memory including a context having
      a set of words and utterances selected to allow recognition of the words and utterances by a speech recognizer, and
      a set of distracters, which comprise sets of syllables used less frequently in the context, the sets of syllables not forming words or utterances in the context;
   logic that receives an audio input;
   logic that compares the input with information in the context;
   logic that, if the input more closely matches a distracter than a word or utterance, ignores the input; and
   logic that otherwise processes the input to determine an associated word or utterance.

8. The system of claim 7, wherein the distracters have lengths in the range of 1 to n+2 syllables, wherein n comprises the number of syllables the word having the largest number of syllables in the context.

9. The system of claim 7, wherein a distracter does not include the same syllable next to the same syllable.

10. The system of claim 7, including logic that processes the input with a speech recognizer and adjusts the speech recognizer based on data regarding past performance of the student.

11. The system of claim 7, the memory including a set of subcontexts, each subcontext including the words and utterances of the context and selected mispronunciations or misarticulations of the words and utterances of the context, and wherein the system includes logic that processes the input to determine whether the input matches a word, utterance, or mispronounciation or misarticulation thereof in a selected subcontext.

12. The system of claim 11, including, logic that, based on data regarding past performance of the student, selects the subcontext.

* * * * *